No. 839,851. PATENTED JAN. 1, 1907.
C. HYDE.
MACHINE FOR MANUFACTURING HOSE OR TUBES.
APPLICATION FILED OCT. 30, 1906.

4 SHEETS—SHEET 2.

WITNESSES

INVENTOR
Courtney Hyde
BY
ATTORNEY

No. 839,851. PATENTED JAN. 1, 1907.
C. HYDE.
MACHINE FOR MANUFACTURING HOSE OR TUBES.
APPLICATION FILED OCT. 30, 1906.

4 SHEETS—SHEET 3.

WITNESSES: INVENTOR
Sophie Peterson Courtney Hyde
Otto J. Christ BY
J. R. Hindon Hyde
ATTORNEY

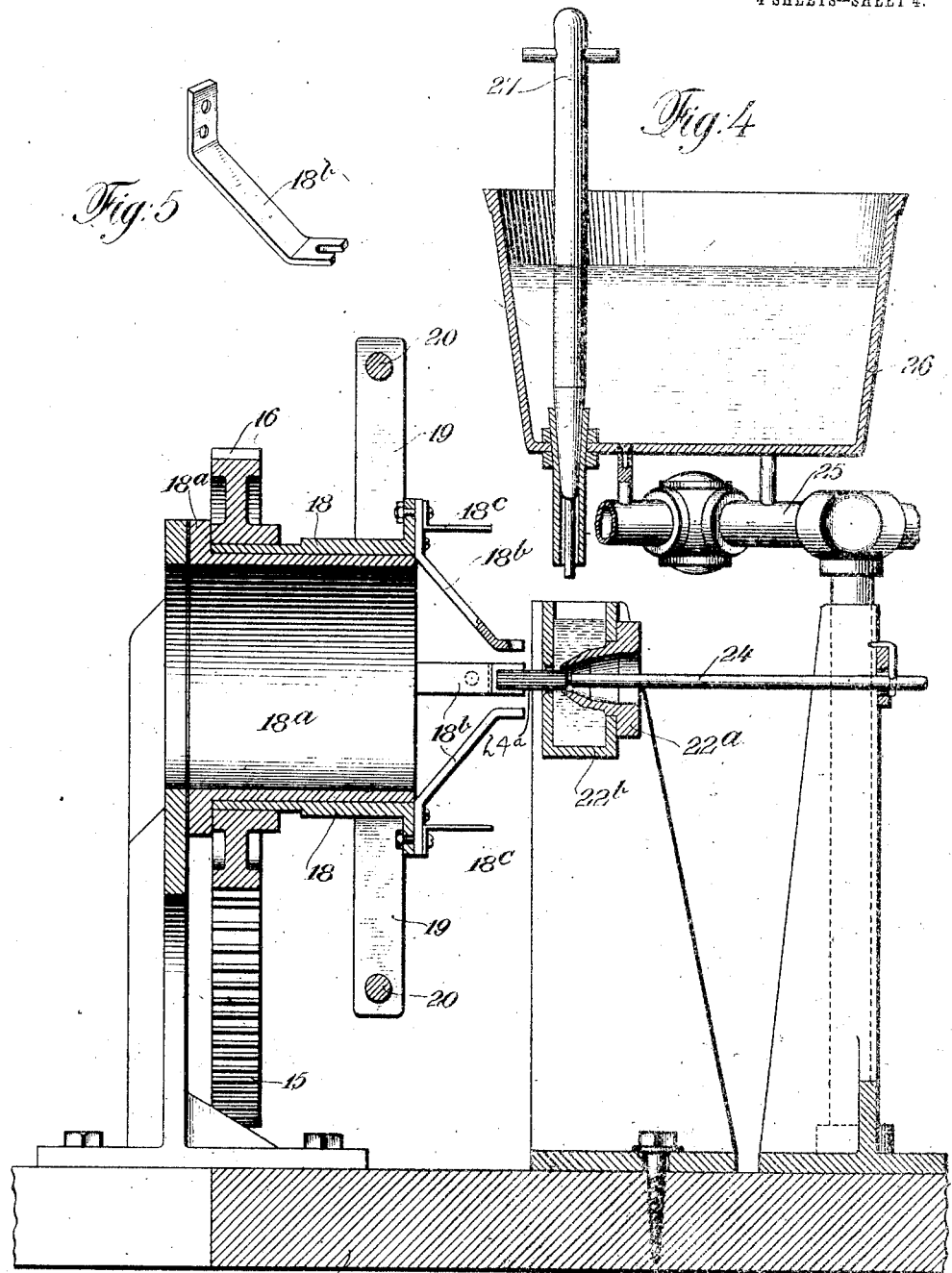

UNITED STATES PATENT OFFICE.

COURTNEY HYDE, OF NEW YORK, N. Y., ASSIGNOR TO ALPHADUCT MANUFACTURING COMPANY, OF JERSEY CITY, NEW JERSEY, A CORPORATION OF NEW YORK.

MACHINE FOR MANUFACTURING HOSE OR TUBES.

No. 839,851.

Specification of Letters Patent.

Patented Jan. 1, 1907.

Application filed October 30, 1906. Serial No. 341,232.

*To all whom it may concern:*

Be it known that I, COURTNEY HYDE, a citizen of the United States of America, and a resident of the borough of Manhattan, city of New York, and State of New York, have invented certain new and useful Improvements in Machines for Manufacturing Hose or Tubes, of which the following is a specification.

This invention relates to machines for manufacturing hose or tubes, and particularly conduits for electric wires.

While the principles of the construction of the machine are particularly adapted to manufacturing conduits for electric wires, they are also applicable to machines for manufacturing all tubes and pipes which contain an inner longitudinal lining, on which is a reinforcing-winding of a filamentary body and weatherproof coating, like pitch, which will harden when cold or dry, and the use of the machine is therefore not limited to any particular class of tubing.

Essentially it consists, first, in the combination, in a machine for manufacturing tubes on a mandrel on which the inner lining is formed and means for coating the inner portion of the lining with talcum or other suitable non-frictional substance, so that the plastic coating substance will not stick the lining to the material; second, in a machine of the kind described of means for coating the lining with said plastic waterproof coating; third, in a machine of the kind described of means for winding on the reinforcing-windings; fourth, in a machine of the kind described of a device for drawing the completed tube along as it is formed; fifth, in the combination of said coating, winding, and drawing devices with such other elements as are necessary to produce an operating-machine for any given kind of tubing.

The drawings which accompany the specification illustrate a machine which is particularly adapted to the manufacture of conduits for electric wires, such as are described in United States Letters Patent No. 693,916, dated February 25, 1902; but the invention is not limited to machines for such specific purpose, and in a general way the machine is an improvement upon and a simplification of the machine described in United States Letters Patent No. 791,729, dated June 6, 1905.

Figure 1:
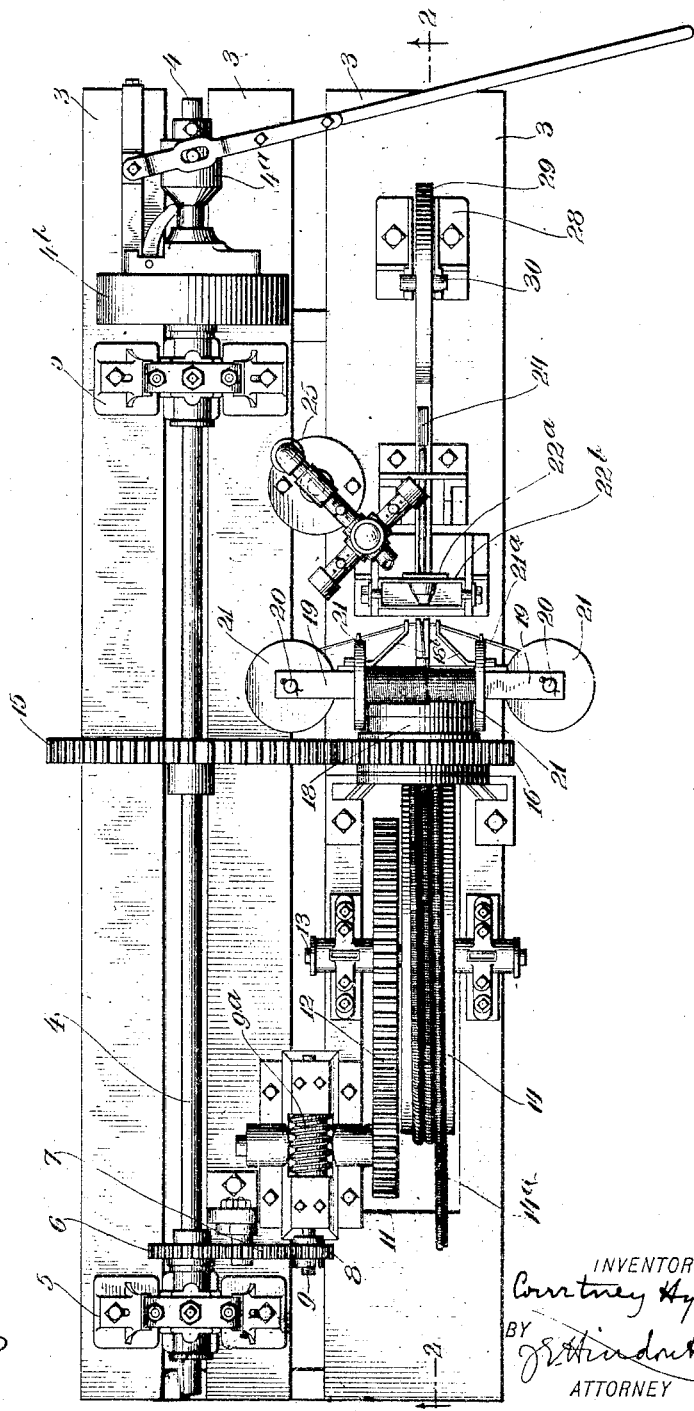
Figure 2:
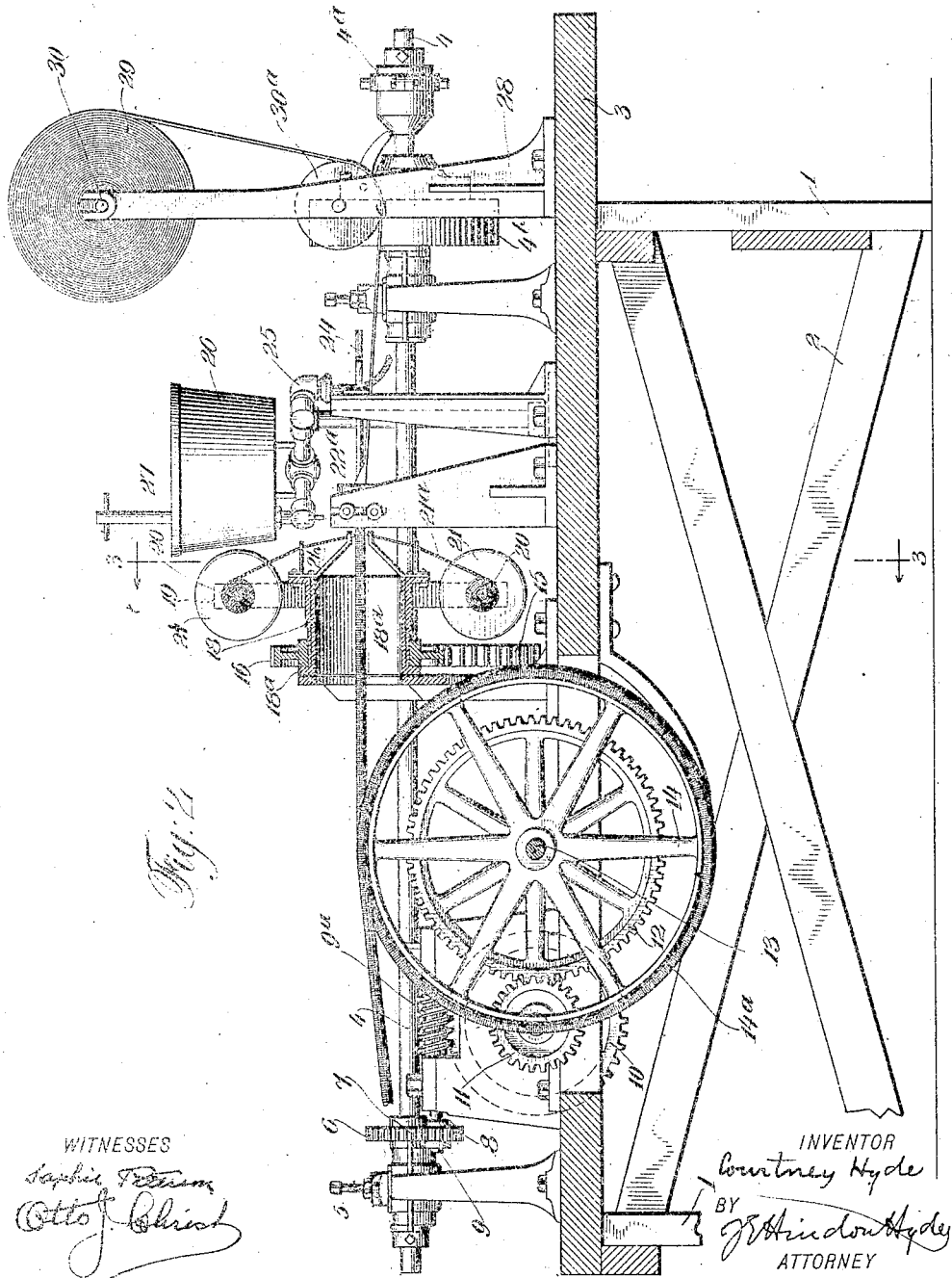
Figure 3:
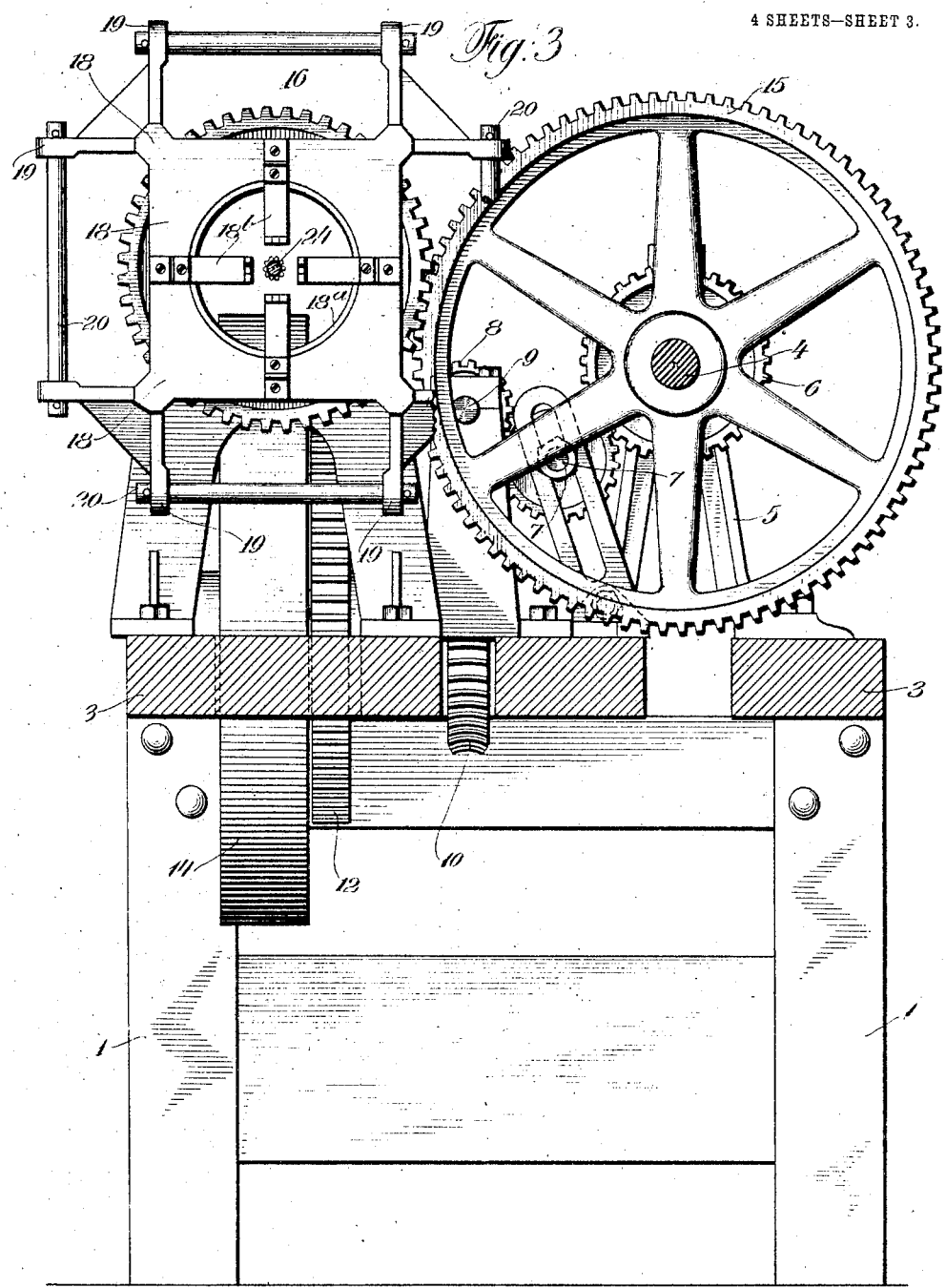

Referring to the drawings, Figure 1 is a plan view of the machine. Fig. 2 is a longitudinal vertical sectional elevation of the machine on the line 2 2 of Fig. 1. Fig. 3 is an elevation, partly perspective and partly cross-sectional, on the line 3 3 of Fig. 2, showing on a larger scale certain details of the machine hereinafter referred to. Fig. 4 is a part perspective and part sectional view of the former and adjacent parts of the mandrel, showing the smear-pot and heater and indicating three of the winders. Fig. 5 is a perspective view of one of the winding-guides through which the winding-cords pass.

Similar numbers of reference refer to similar parts throughout the several views.

The construction of the machine will be best understood by a description of its operation.

Referring more especially to Fig. 2, 30 is a drum mounted upon the standards 28, secured to the frame and standards of the machine 1, 2, and 3. The drum 30 has wound upon it a strip of canvas 29 or other suitable flexible material, which forms the inner longitudinal lining of the conduit $14^a$. This canvas strip has been previously cut to proper width. This strip is drawn under a perforated drum $30^a$, containing talcum powder, soapstone, or other non-frictional substance, whereby it receives a coating of such powder on its inner surface. The strip 29 is then drawn over the mandrel 24 through the former or thimble $22^a$, and thence over the reamer $24^a$, the inner end of which extends through the smear-pot $22^b$, containing the melted pitch or other waterproofing compound. The waterproofing preparation is kept melted in the melting-pot 26 by the heating device 25, which may be a gas-heater or any other suitable heater and is admitted to the smear-pot $22^b$ by the hand-valve 27. In this smear-pot $22^b$ the circular canvas tube is coated with the waterproofing preparation and passes thence over the reamer $24^a$, which, as shown, has longitudinal corrugations upon it designed to neutralize the torsion produced by the winding-cords next to be described. Upon the hollow shaft $18^a$ is mounted the revolving cylinder or drum 18, carrying the four (more or less, if desired) frames 19. Mounted in these frames upon the shafts 20 are the spools 21, upon which the cords 21ª are wound. These cords pass over the ends of and are guided by the guides 18ᵇ, also mounted upon the revolving cylinder or drum 18. 18ᶜ represents supplementary guides through which the cords 21ª pass before reaching the main guides 18ᵇ. The coated tube upon the corrugated reamer 24ª is wound by means of the winders, just above described, with four (more or less) cords which are embedded in the still soft exterior waterproof coating of the tube, and thus reinforce the strength of the tube at the same time that they give it flexibilty. The coated tube 14ª thus completed passes round the winding-drum 14, which in its revolution pulls the completed tube through the machine.

The winding drum or reel 14, mounted upon the shaft 13, and the revolving cylinder 18 are driven by the main shaft 4, mounted in the bearings 5, which is thrown in and out of operation by means of the hand-lever 4ª and friction-clutch 4ᵇ.

The winding drum or reel 14 is driven by the main shaft 4 by means of the gear-wheel 6, idler 7, gear 8, mounted upon the shaft 9, carrying the worm 9ª, driving the worm-gear 10, which has mounted upon its shaft the gear 11, meshing with the larger gear 12, mounted upon the shaft 13 of the winding drum or reel 14. The revolving cylinder 18, carrying the winding-guides, is revolved from the main shaft 4 by means of the gears 15 and 16.

It will be understood that the gears driving the winding drum or reel 14 and those driving the revolving cylinder 18 must be so proportioned in speed with regard to each other that the completed tube will not be drawn through the machine by the winding drum or reel 14 faster than it is wound by the winding-guides upon the revolving cylinder 18 with the cords 21ª.

Referring to Fig. 4, it will be noted that the former 22ª extends into the smear-pot 22ᵇ to within a short distance of the rear wall of the smear-pot. The object of this is that the edges of the canvas ribbon forming the inner tube lining are held together over the mandrel while passing through the smear-pot, and the pitch or other weather proofing compound cannot pass through the crack or crevice to the inner side of the lining or onto the mandrel.

It will be seen that in my simplified machine I have done away with the necessity of a supplementary winding to the canvas tube before it reaches the smear-pot. I have also made such changes in the smear-pot of the old machines as obviate this necessity, and, furthermore, no pickers or other feeding devices such as were used in the old machines are necessary in mine, for the winding drum or reel which draws the tube through the machine takes the place of these feeding devices. Such feeding devices were objectionable in that they marred the surface of the tube and also that they materially weakened its strength to such an extent that they sometimes broke the winding-cord surrounding the tube. It will further be noticed that I have simplified the old machines by rendering it unnecessary to use the cooling devices and hollow mandrel necessary in them. This I have accomplished by exposing so small a surface of the tube to the heated pitch or other weatherproofing compound at any one time that the mandrel and the tube have not time to become heated to any objectionable degree. Still, again, by my construction of the winding device and the form and position of the guides I have eliminated the necessity of the use of any tension devices for the cords, as were necessary in the old machines, and this for the reason that my machine winds the tube so close to the smear-pot that the cords are embedded in the pitch while it is still soft, and, further, that by means of the pulling of the tube through the machine the winding-cords are pulled against the ends of the winding-guides instead of away from them, as was the case in the former machines, allowing the use of guiding-slots instead of holes, thereby eliminating the time formerly taken to thread the cord through the holes.

Having thus described my invention, what I claim is—

1. The combination in a machine of the kind described of a mandrel, means for drawing a tube over said mandrel and through the machine, a former for shaping said tube, a smear-pot containing a waterproof coating substance for coating said tube, said former extending into the smear-pot to within a short distance of the rear wall, means for keeping said coating substance in a fluid condition, a winding device for reinforcing said tube with cords, said winding device being placed in such close proximity to the smear-pot that the winding-cords are embedded in the waterproof coating while warm, and a driving mechanism for operating said machine, substantially as described.

2. The combination in a machine of the kind described of a mandrel, means for drawing a tube over said mandrel and through the machine, a former for shaping said tube, a smear-pot containing a waterproof coating substance for coating said tube, said former extending into the smear-pot to within a short distance of the rear wall, means for keeping said coating substance in a fluid condition, a winding device for reinforcing said tube with cords, said winding device being placed in such close proximity to the smear-pot that the winding-cords are embedded in the waterproof coating while warm, and said winding device having guides as shown through the ends of which the reinforcing-cords pass so as to pull against the backs of the said guides, and a driving mechanism for operating said machine, substantially as described.

3. The combination in a machine of the kind described of a mandrel, means for drawing a tube over said mandrel and through the machine, a former for shaping said tube, a smear-pot containing a waterproof coating substance for coating said tube, said former extending into the smear-pot to within a short distance of the rear wall, means for keeping said coating substance in a fluid condition, a winding device for reinforcing said tube with cords, said winding device being placed in such close proximity to the smear-pot that the winding-cords are embedded in the waterproof coating while warm, and said winding device having guides as shown provided with guiding-slots through which the reinforcing-cords pass so as to pull against the backs of the said guides, and a driving mechanism for operating said machine, substantially as described.

4. The combination in a machine of the kind described of a mandrel, means for drawing a tube over said mandrel and through the machine, means for coating the interior of said tube with a non-frictional substance, a former for shaping said tube, a smear-pot containing a waterproof coating substance for coating said tube, said former extending into the smear-pot to within a short distance of the rear wall, means for keeping said coating substance in a fluid condition, a winding device for reinforcing said tube with cords, said winding device being placed in such close proximity to the smear-pot that the winding-cords are embedded in the waterproof coating while warm, and a driving mechanism for operating said machine, substantially as described.

5. The combination in a machine of the kind described of a mandrel, means for drawing a tube over said mandrel and through the machine, means for coating the interior of said tube with a non-frictional substance, a former for shaping said tube, a smear-pot containing a waterproof coating substance for coating said tube, said former extending into the smear-pot to within a short distance of the rear wall, means for keeping said coating substance in a fluid condition, a winding device for reinforcing said tube with cords, said winding device being placed in such close proximity to the smear-pot that the winding-cords are embedded in the waterproof coating while warm, and said winding device having guides as shown through the ends of which the reinforcing-cords pass so as to pull against the backs of the said guides, and a driving mechanism for operating said machine, substantially as described.

6. The combination in a machine of the kind described of a mandrel, means for drawing a tube over said mandrel and through the machine, means for coating the interior of said tube with a non-frictional substance, a former for shaping said tube, a smear-pot containing a waterproof coating substance for coating said tube, said former extending into the smear-pot to within a short distance of the rear wall, means for keeping said coating substance in a fluid condition, a winding device for reinforcing said tube with cords, said winding device being placed in such close proximity to the smear-pot that the winding-cords are embedded in the waterproof coating while warm, and said winding device having guides as shown provided with guiding-slots through which the reinforcing-cords pass so as to pull against the backs of the said guides, and a driving mechanism for operating said machine, substantially as described.

COURTNEY HYDE.

Witnesses:
J. E. HINDON HYDE,
OTTO J. CHRIST.